May 5, 1953 E. I. FLATEBOE Re. 23,650

RECHIPPER WITH VIBRATING TROUGH

Original Filed Oct. 17, 1949 4 Sheets-Sheet 1

Inventor

EINAR I. FLATEBOE

By Cook & Robinson

Attorney

RECHIPPER WITH VIBRATING TROUGH

Original Filed Oct. 17, 1949 4 Sheets-Sheet 2

Inventor
EINAR I. FLATEBOE
By Cook & Robinson
Attorney

RECHIPPER WITH VIBRATING TROUGH

Original Filed Oct. 17, 1949 4 Sheets-Sheet 3

Inventor
EINAR I. FLATEBOE
By Cook & Robinson
Attorney

RECHIPPER WITH VIBRATING TROUGH

Original Filed Oct. 17, 1949 4 Sheets-Sheet 4

Inventor
EINAR I. FLATEBOE
By Cook & Robinson
Attorney

Reissued May 5, 1953 Re. 23,650

UNITED STATES PATENT OFFICE 23,650

RECHIPPER WITH VIBRATING TROUGH

Einar I. Flateboe, Everett, Wash., assignor to Sumner Iron Works, Everett, Wash., a corporation of Washington Original No. 2,582,537, dated January 15, 1952, Serial No. 121,799, October 17, 1949. Application for reissue November 3, 1952, Serial No. 318,539

10 Claims. (Cl. 241—92)

Matter enclosed in heavy brackets [ ] appears in the original patent but forms no part of this reissue specification; matter printed in italics indicates the additions made by reissue.

This invention relates to machines that are known in the industry in which they are used as "re-chippers"; such machines being designed for the chipping and reducing to usable material, those slivers, strips and pieces of wood other than chips that are incident to a normal wood chipping operation as carried out by present day machines in the making of pulp wood chips.

For a better understanding of the need for and uses of the improvements of the present invention, it will be here explained that in the chipping of wood bolts by present day high speed machines, as practiced in the paper pulp industry, the operation results in the formation, along with the desired chips, of a certain quantity of slivers, strips and other pieces that are "off size." It is not economical to waste this "off size" material since it comprises an appreciable percentage of the wood going through the chipper. Therefore, it has been a common practice to pass it again through the chipper. However, due to the character of the material, and since, to my knowledge, no practical means has been associated with present day chippers to "line up" the slivers and strips to cause them to be advanced endwise to the cutters as are the wood bolts, the rechipping operation has not been entirely satisfactory. Because of the promiscuous manner in which the pieces of "off size" material have been fed to the chipper, additional slivers and unusable pieces are just as apt to be produced therefrom, as not. It is only when the slivers or strips are chipped to short length that they are desirable for use in the making of pulp and this can only be accomplished by bringing the pieces of material into alignment for endwise advancement to the chipper blades.

In view of the requirements as above set forth, it has been the principal object of this invention to provide a "re-chipper," which may employ the usual form of chipper disk and knives, but which is characterized by a feeding hopper of novel form whereby the slivers, strips and other pieces of odd form, after being dumped thereinto in promiscuous order, by a vibratory action imparted to the hopper will be automatically brought into alignment, compacted and fed endwise into the chipper and chipped thereby into pieces that are of the desired character for use in the making of pulp.

It is also an object of this invention to provide a re-chipper wherein the bringing of the promiscuously intermingled slivers and other pieces of off size into alignment for the re-chipping operation is effected by use of a downwardly inclined feeding hopper in the form of a V-shaped trough, equipped with means whereby it may be agitated or vibrated in such manner that the material placed therein for chipping is caused to automatically advance therealong for delivery into the chipper and the pieces automatically brought into alignment and compacted for advancement endwise into the path of travel of the chipper blades.

It is also an object to provide a vibrating feed hopper with means of support so arranged that the vibratory action is gradually lessened toward the discharge end of the hopper so as not to nullify the compacting action.

Further objects of the invention reside in the details of construction and combination of parts employed in the re-chipper and in its mode of operations, as will hereinafter be fully described.

In accomplishing these and other objects of the invention, I have provided the improved details of construction, the preferred forms of which are illustrated in the accompanying drawings, wherein—

Figures 1, 2:
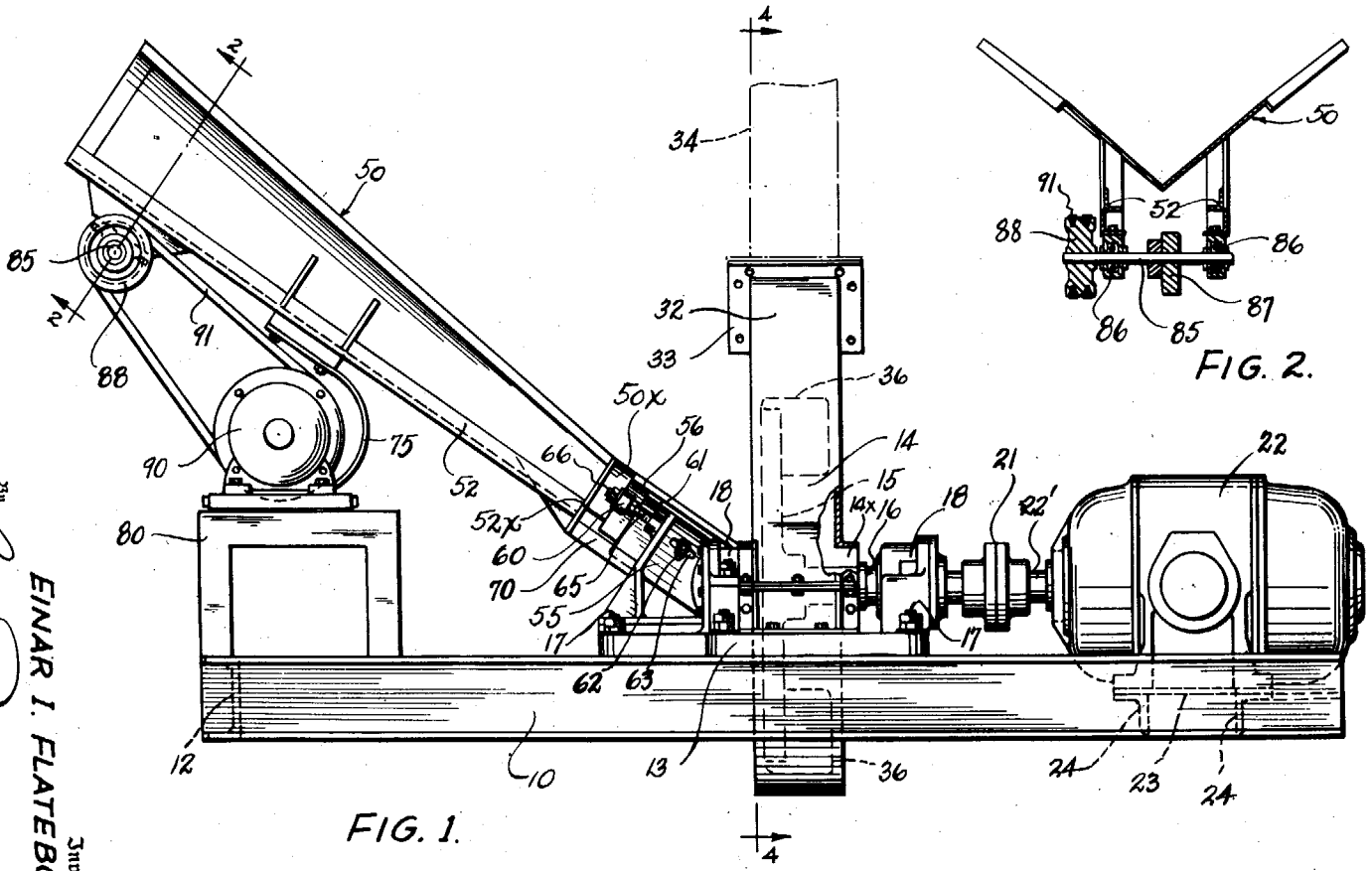
Fig. 1 is a side view of a re-chipper embodying the improvements of the present invention therein.
Fig. 2 is a cross-section, taken on the line 2—2 in Fig. 1.

Referring more in detail to the drawings—

For the present re-chipping operation I preferably employ a common type of wood chipper, and equip it with a feed hopper that embodies the novel features of the present invention therein. As shown best in Fig. 1, the re-chipper comprises a horizontal base structure, fabricated from channel iron members and comprising opposite side beams 10—10', joined in parallel, spaced relationship by cross members 12. Fixed upon the base structure, transversely thereof and at a location substantially medially of its opposite ends, is a rectangular, open frame 13 within which the casing, or housing, 14 of the chipper is fixed, and in which housing a chipper disk 15 is supported for rotation by its drive shaft 16. The frame member 13 is suitably secured to the opposite side beams of the base structure by bolts 17 passed through its corner portions.

The drive shaft 16 of the chipper extends horizontally and lengthwise of the base frame and is revolvably mounted in bearings 18—18 that are formed on the rectangular frame 13 at its opposite sides. It is operatively connected at one end, through the mediacy of a coupling 12, with the drive shaft 22′ of an electric motor 22. The motor is mounted in the base frame on plate 23 supported by cross members 24—24 as illustrated in Fig. 1.

The chipper disk 15 revolves in a vertical plane, close to one side wall of its enclosing housing 14. The disk is formed at intervals of 60° about its axial center, with rectangular openings 25 therethrough, and set in the disk, at the following edges of these openings and at a proper angle, are the chipper blades 28, secured to the disk by bolts 30.

Figure 4:
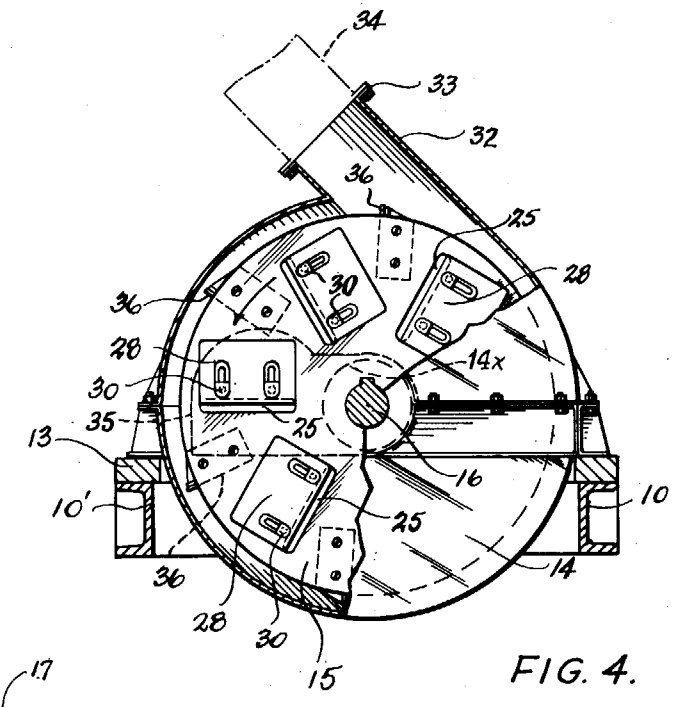
Fig. 4 is a cross-section on the line 4—4 in Fig. 1.
Figure 9:
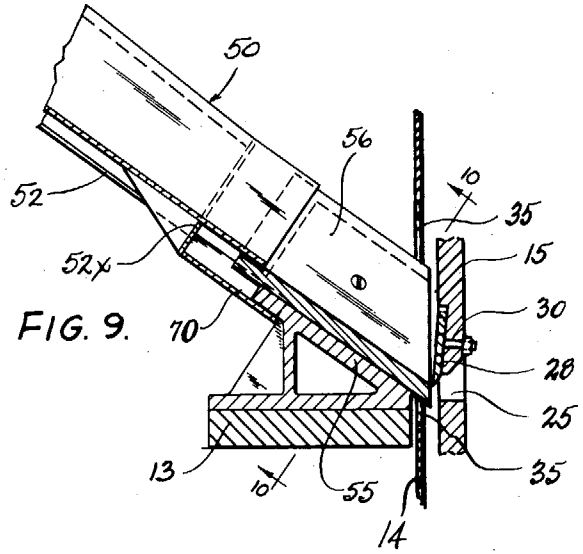
Fig. 9 is a central vertical section of the spout and anvil, showing the application of the discharge end of the hopper thereto.

The enclosing housing 14 of the chipper is of involute form for a purpose presently apparent. At the top, it is formed into a tangential discharge spout 32 and this is flanged, as at 33, for connection with a tube, shown in dotted lines at 34, that leads to a point of use of the chips or to storage. Formed in that side wall of the housing 14 that is closely adjacent the disk, and spaced from the disk axis as best shown in Figs. 4 and 9, is an opening 35, through which the material to be chipped is fed from the hopper, across an anvil and to the chipper knives. The relationship of the anvil, presently described, to the path of travel of the chipper knives is such that the knives will coact therewith to cut into chips the pieces of material that are delivered or advanced into their path of travel.

The disk 15 is equipped on that side opposite the blades with a plurality of radially extending fins 36 which operate as fan blades to draw air into the housing 14 through side wall openings 14x and to expel it through the discharge spout 32, thus to convey the chips therewith to storage or point of use.

Figure 6:
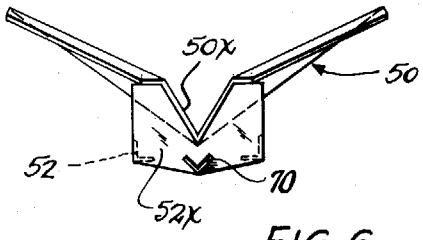
Fig. 6 is an elevation of the hopper as seen from its discharge end.
Figure 8:
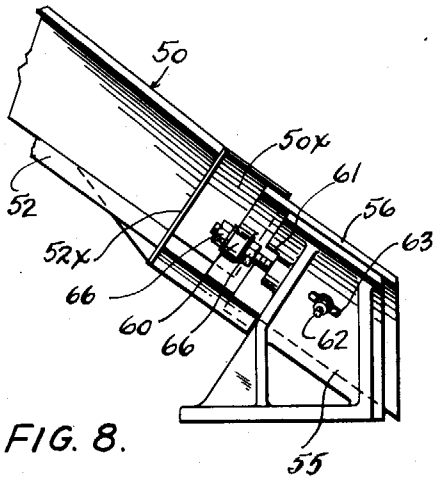
Fig. 8 is a side view of the spout and anvil by which the lower end of the feed hopper is supported.

The novelty of the present invention resides in the means for and manner of feeding the "off size material" comprising slivers, strips and pieces of other form to the chipper. This will now be described:

The feed hopper is designated in its entirety by numeral 50. Preferably it is made of sheet metal, in the form of a V-shaped trough and as applied to the chipper, it is downwardly inclined to the receiving opening 35 in the adjacent side wall of the chipper housing. The hopper trough converges in width and decreases in depth its discharge end as shown best in Figs. 5 and 6.

Figure 5:
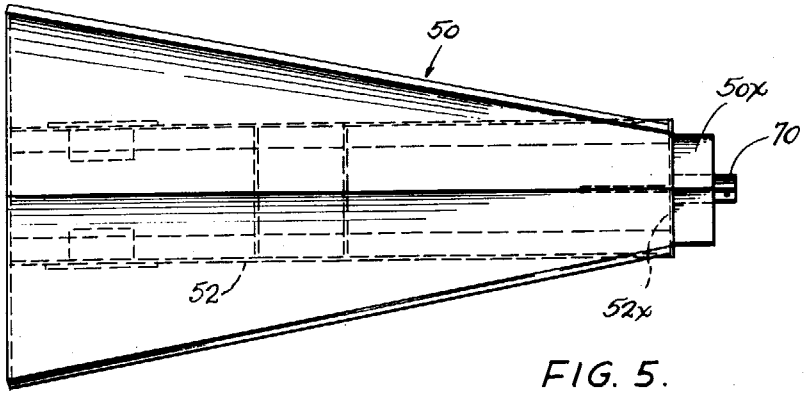
Fig. 5 is a top or plan view of the hopper.
Figure 7:
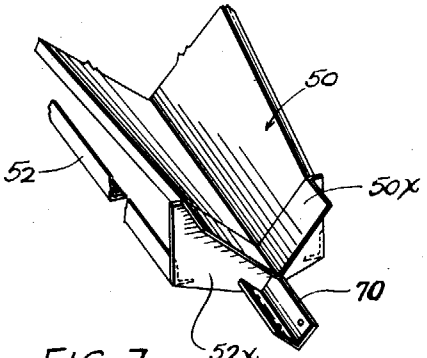
Fig. 7 is a perspective view of the lower end portion of the hopper.
Figure 10:
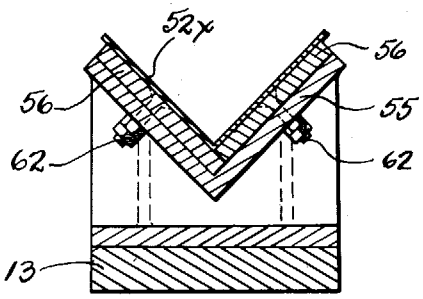
Fig. 10 is a cross-section taken on line 10—10 in Fig. 9.

It is shown in Fig. 5 that the hopper is of substantial width at its higher end. At its discharge end it leads into a short V-shaped extension, or spout, 50x, the opposite side walls of which are set at a lesser angle than the angle of the outer end of the trough. Thus, as the material moves down the hopper trough and into the extension, it is brought into a more compact mass. The hopper is mounted upon a rectangular, fabricated frame 52 that extends from even with its outer end to the plane of connection with the spout portion 50x and there is rigidly secured to a cross web 52x as seen in Fig. 7.

The hopper mounting frame 52 is resiliently supported at a location intermediate its ends by such means and in such manner that the vibratory action, presently described, for the automatic feeding and aligning of the material, is made possible.

Figure 3:
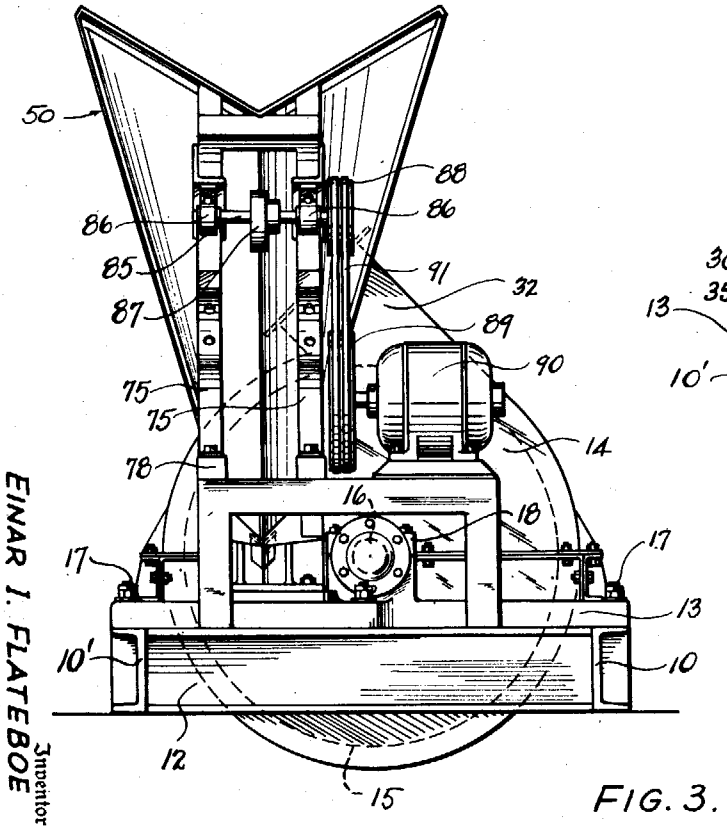
Fig. 3 is an end elevation of the machine.

At its lower end the feed hopper 50 is supported by a spout 55 that is fixed upon the frame 13 closely adjacent the chipper housing and in alignment with the opening 35. The spout comprises a one piece casting, formed with a V-shaped trough-like and upwardly opening seat, in alignment with and directed downwardly toward the housing opening 35 as noted in Figs. 3 and 9.

Figure 11:
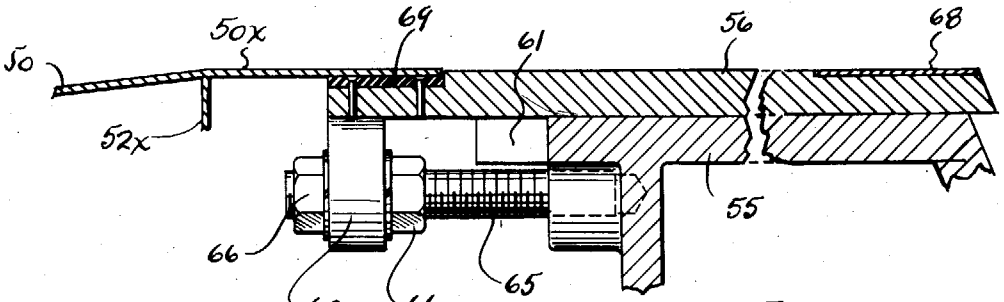
Fig. 11 is an enlarged sectional detail of a portion of the anvil.

Disposed in the V-shaped seat of the spout, and flatly against the opposite faces thereof as seeen in Fig. 11, are plates 56—56 which together constitute the anvil, and form a downwardly inclined trough that extends through the chipper housing opening 35 for the delivery of the material to the chipper disk for cutting by the blades. The outer ends of the plates 56—56 extend somewhat beyond the higher end of the trough and serve as a support in which the similarly shaped, lower end portion 50x of the feed trough 50 is rested as observed in Fig. 9. The wood material that is caused to be advanced downwardly in the hopper trough 50 moves into the anvil trough and thence directly into the chipper for the re-chipping operation.

As a feature of the present construction, each anvil plate is formed on its underside and at the outer end with a lug 60 that is aligned with a notch 61 in the outer end edge of the corresponding supporting wall of the spout. Also, each plate has a bolt 62 fixed therein and extended downwardly and through a slot 63 formed in the supporting wall portion of the spout, in the longitudinal direction of the trough. These bolts may be tightened to hold the inner end edges of the plates in proper relationship to the chipper blades, and are loosened when plate adjustment is to be made. Securement of the plates 56—56 is further effected by stud bolts 65 that are fixed in the body portion of the spout parallel with its direction, and direction of the plates 56. These studs are passed through holes in the plate lugs 60 and are equipped at opposite sides of the lugs with lock nuts 66 that may be adjusted thereon to effect the inward or outward adjustment of the plates and then to retain the adjustment.

It is shown also in Fig. 11 that the anvil plates are faced at their inner ends with hard steel plates 68 to withstand wear, and also, at their outer ends have strips of material 69 such as rubber belting, set therein to prevent frictional wear on the hopper spout 50x.

The frame 52 which mounts the hopper also has an extension member 70 fixed to its lower end in position to project beneath and slidably engages with the spout end to prevent the lower end of the hopper from being lifted upwardly.

Inwardly from its higher or outer end, the hopper 50 is suported resiliently for its vibratory action by means of two laterally disposed leaf springs 75—75 fixed to the undersides of the longitudinal members of frame 52 and to blocks 78 secured on a supporting frame structure 80 erected upon the man base frame. The leaf springs are substantially semi-circularly curved and are bolted at their upper ends to the frame 52, but are independent in action.

The vibratory action of the hopper trough for the automatic feeding and aligning of material is effected by the following means:

Mounted across the underside of the frame structure 52 is a shaft 85, revolvable in bearings 86—86 fixed to the opposite side members of said frame. Fixed on the shaft between the bearings, is an eccentric fly wheel 87 and on one end of shaft is a V-belt pulley wheel 88 aligned with the drive pulley 89 of an electric motor 90 that is mounted on the frame 80 as noted in Fig. 3. A belt 91 is extended about these pulleys for the driving of the shaft thus, by reason of the eccentric 87 to set up a vibratory action of the hopper 50.

Assuming the device to be so constructed, its mode of use is as follows:

The material to be re-chipped, comprising slivers, strips, etc., in promiscuous order is delivered into the higher end of the hopper trough, and the motor 90 set in motion to effect rotation of the cross shaft 85 at a substantially high rate. By reason of the eccentric 87, a vibratory action of the hopper is thus set up and this causes a gradual progression of the material toward the discharge end of the hopper. As the material advances, the slivers and pieces are caused to automatically move into alignment in the direction of the trough, and to be more and more compacted as they advance. The vibratory action which is quite pronounced at the outer end of the hopper becomes less pronounced in accordance with the lessening of the distance to the chipper due to the fact that the discharge end of the hopper is rested in the anvil. Any disrupting of the compacted mass of material as it moves into the anvil trough is thus avoided. It is to be understood that there is no fixed connection between the lower end of the hopper and the anvil; and any slippage between the part 50x of the hopper and its support that is necessary can take place.

With the pieces of material aligned and compacted in this way, as they advance from the anvil to the chipper blades, the chipping can be properly accomplished, thus making available for use, all the material which heretofore has been both difficult to handle and to effectively reduce.

Such machines may be made in sizes to meet requirements, and may employ chippers of the kind shown or of other types which are adapted to be fed from a hopper of the character embodied in this invention.

The material to be re-chipped and which may comprise pieces of sliver-like character, strips, block and other odd size pieces, will be referred to as "reject material."

Having thus described my invention, what I claim as new there, and desire to secure by Letters Patent, is:

1. A re-chipper for reject material from a wood chipping operation comprising, in combination, a wood chipper having chipper blades and a rigidly mounted, inclined anvil of V-shaped trough-like form within which material to be re-chipped is received and advanced to the chipper blades, a feed hopper in the form of a V-shaped trough, supported in a downwardly inclined position to receive said reject material thereinto at its higher end and to discharge it from its lower end into the higher end of the anvil; said hopper being slidably rested at its lower end in the anvil trough and having a resilient means of support for its outer end, and power operated means for causing a vibratory action of the hopper whereby an automatic advancement of contained material therealong is effected, and means fixedly supporting the anvil therein for longitudinal adjustment.

2. A re-chipper as recited in claim 1 wherein the anvil supporting means comprises a V-shaped trough-like spout that is fixed relative to the chipper and said anvil is supported by and is longitudinally adjustable in said spout and extends beyond it at its lower end for coaction with the chipper blades and is equipped with means for securing it in adjustment.

3. A re-chipper as recited in claim 1 wherein the trough-like spout is fixed relative to the chipper and said anvil comprises complemental, opposite side plates seated against corresponding walls of the spout, each plate having a lug depending from its outer end and said lugs having holes therethrough, stud bolts fixed in the spout and extended through the holes of said lugs, and nuts threaded onto the studs to engage said lugs to effect and retain adjustment of the anvil plates.

4. A combination as recited in claim 1 wherein the means for effecting the vibratory action of the hopper comprises a cross shaft rotatably supported by the hopper from its higher end portion, means for rotating the shaft and a weight applied eccentrically to the shaft.

5. A re-chipper for reject material from a wood chipping operation comprising in combination, a wood chipper having chipping blades and an anvil of trough-like form within which material to be re-chipped is received and advanced to the chipper blades, a feed hopper in the form of a V-shaped trough, rested at its discharge end in the anvil trough to discharge material thereto, spring means supporting the hopper in a position downwardly inclined toward the anvil, an unbalanced rotary means supported by the hopper at its outer end, means for rotating said unbalanced rotary means to cause a vibratory action of the hopper to be set up whereby material delivered into the hopper at its higher end for re-chipping is caused to be advanced toward the lower end and the pieces thereof to be aligned and compacted as they advance; the angle formed by the opposite side walls of the trough being decreased gradually from the outer to the lower end of the trough.

6. A re-chipper for reject material from a wood chipping operation comprising, in combination, a wood chipper having chipping blades, a spout fixed adjacent the chipper, an anvil of trough-like form mounted in said spout and within which material to be re-chipped is received and advanced to the chipper blades, a downwardly inclined feed hopper in the form of a V-shaped trough, the side walls of which are laterally flared from the discharge end to the outer end, and the trough angle formed thereby being gradually decreased from the outer to the inner end of the hopper; said hopper being rested at its lower end in said anvil to deliver the material for re-chipping thereinto, and said hopper being equipped with a longitudinal supporting frame, an extension member at the lower end of the said frame engaged beneath the outer end of said spout to functionally retain the hopper end in the trough of the anvil, a cross shaft horizontally mounted by said frame near its outer end, an eccentric fly wheel on said shaft, means for rotating the shaft, and resilient means supporting the said frame intermediate its ends for vibratory action as induced by the rotation of said flywheel.

*7. A rechipper for reject material comprising in combination, a wood chipper having chipper blades and an anvil of trough-like form disposed to receive reject material for its advancement therein to the chipper blades, a feed hopper in the form of a V-shaped trough aligned with the anvil, means for resiliently supporting the hopper intermediate its ends in a downwardly inclined position for the gravitational advancement of reject material, received therein at its higher end, to its lower end for direct discharge therefrom into the anvil, and means operable to impart vibratory movement to the hopper at its higher end for facilitating the gravitational advancement and the compacting of the contained body of the reject material as it is advanced to the anvil.*

*8. A rechipper for reject material comprising in combination, a wood chipper having an anvil of V-shaped, trough-like form and chipper blades arranged to coact therewith for the chipping of material advanced in the anvil to the blades, a tapered, V-shaped feed hopper of trough-like form aligned with the anvil to discharge reject material directly thereinto, a resilient element supporting the hopper intermediate its ends in a downwardly inclined position sufficient for the gravitational advancement of reject material received in its higher end to its lower end, means secured to the higher end of the hopper operable to impart vibratory movement to facilitate the gravitational advancement and the compacting of the body of reject material contained therein, and to effect a positive feeding of material into the anvil and to the chipper blades under the weight of material higher in the hopper.*

*9. A rechipper for reject material comprising in combination, a wood chipper having chipper blades and an anvil of trough-like form within which material to be rechipped is received and advanced to the chipper blades; a feed hopper in the form of a V-shaped trough, supported in a downwardly inclined position to receive said reject material thereinto at its higher end and to discharge it from its lower end; said hopper mounted for discharge from its lower end into the trough of said anvil and having a resilient means of support for its outer end, a cross-shaft rotatably supported by the hopper from its higher end portion, means for rotating the shaft and a weight applied eccentrically to the shaft for causing vibratory action of the hopper whereby an automatic advancement of contained material therealong is effected and the pieces which comprise the material will be caused to become aligned and compacted as the material advances to the chipper.*

*10. A rechipper for reject material from a wood chipping operation comprising in combination, a wood chipper having chipping blades, an anvil across which material to be rechipped is advanced to the chipper blades and a feed hopper in the form of a V-shaped trough, supported in an inclined position to receive reject material at its higher end and to discharge it from its lower end across the said anvil for chipping by the chipper blades, and means for effecting a vibratory action of the inclined hopper whereby an automatic advancement of the material therealong is effected; the angle formed by the opposite side walls of the hopper trough being decreased gradually from the outer to the lower end of the trough.*

EINAR I. FLATEBOE.

References Cited in the file of this patent or the original patent

UNITED STATES PATENTS

| Number | Name | Date |
|---|---|---|
| 183,114 | Blake | Oct. 10, 1876 |
| 750,034 | Jamieson et al. | Jan. 19, 1904 |
| 1,014,383 | Frazee | Jan. 9, 1912 |
| 1,129,866 | Hamel | Mar. 2, 1915 |
| 1,229,306 | Mercer | June 12, 1917 |
| 1,515,377 | White | Nov. 11, 1924 |
| 1,684,411 | Rae | Sept. 18, 1928 |
| 2,134,452 | Moore | Oct. 25, 1938 |
| 2,186,652 | Orth | Jan. 9, 1940 |
| 2,417,878 | Luzietti et al. | Mar. 25, 1947 |

FOREIGN PATENTS

| Number | Country | Date |
|---|---|---|
| 7,401 | Denmark | Mar. 7, 1905 |
| 25,614 | Norway | Mar. 1, 1915 |
| 38,781 | France (Addition to No. 691,412) | Apr. 21, 1931 |
| 138,320 | Germany | Mar. 3, 1903 |
| 462,325 | Germany | July 9, 1928 |
| 586,732 | Germany | Oct. 25, 1933 |

OTHER REFERENCES

Syntron: "Vibra-Flow" Feeder Conveyors, Bulletin 252, page r-9. Published by Syntron Co., Homer City, Pennsylvania.